Nov. 21, 1967  D. L. BIANCHETTA  3,353,495
AUTOMATIC ACCUMULATOR BLEED MEANS
Filed March 2, 1966

INVENTOR.
DONALD L. BIANCHETTA

BY
Fryer, Zimmwald, Feix & Phillips
ATTORNEYS

United States Patent Office 3,353,495
Patented Nov. 21, 1967

3,353,495
AUTOMATIC ACCUMULATOR BLEED MEANS
Donald L. Bianchetta, Coal City, Ill., assignor to Caterpillar Tractor Co., Peoria, Ill., a corporation of California
Filed Mar. 2, 1966, Ser. No. 531,211
5 Claims. (Cl. 103—223)

ABSTRACT OF THE DISCLOSURE

A two-valve dumping system for bleeding or relieving high pressures in an accumulator such as used in pressure systems of large vehicles. A pressure responsive valve is connected in series with a valve which is responsive to an adjustment always made at the time the vehicle is shut down for an extended period or for repairs.

Figure 1:
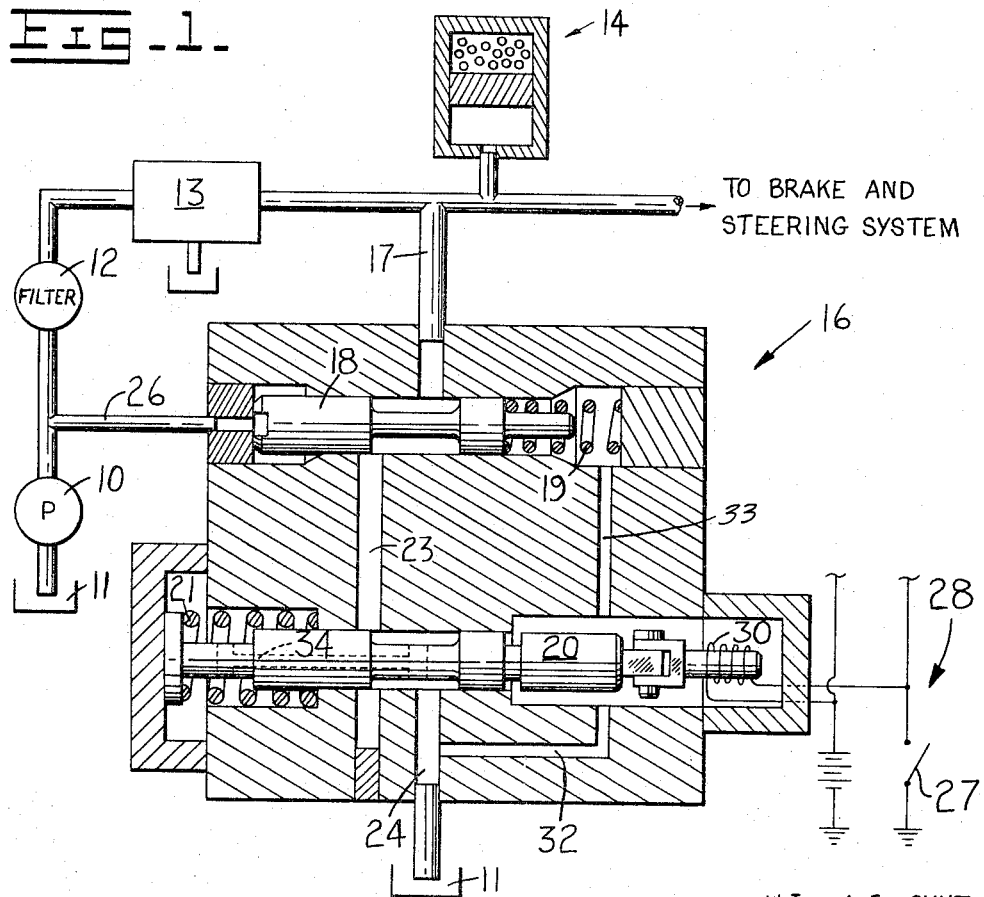

Pressure accumulators are commonly used as reservoirs for hydraulic fluid under pressure in machines that make extensive use of pressure actuated brakes, steering gear and other components. Since such accumulators contain gas which is compressed by the hydraulic fluid pumped into them, they become a hazard particularly in the machine which is out of service and may be under repair. Serious injuries have been caused by inadvertent release of fluid under pressure as well as by small machine parts propelled by such fluid pressure.

Systems have been proposed in which a vent or bleed valve is provided to discharge fluid from an accumulator when the engine of a vehicle is shut down. Some such systems rely on pressure from an engine driven pump for holding the valve closed and the valve is usually opened by spring pressure when the pump is no longer driven. This presents the disadvantage that any engine shut down, even though momentary or accidental, dumps pressure from the accumulator.

The present invention contemplates the use of a two-valve dumping system where one valve is opened in response to pressure failure and the other in response to an adjustment always made at the time the vehicle is shut down for an extended period or for repairs or the like.

It is the object of the present invention to provide valve means of the kind referred to above having means to discharge pressure from an accumulator or like device automatically upon intentional prolonged shutdown of an engine.

Further and more specific objects and advantages of the invention and the manner in which it is carried into practice are made apparent in the following specification by reference to the accompanying drawing.

Figure 2:
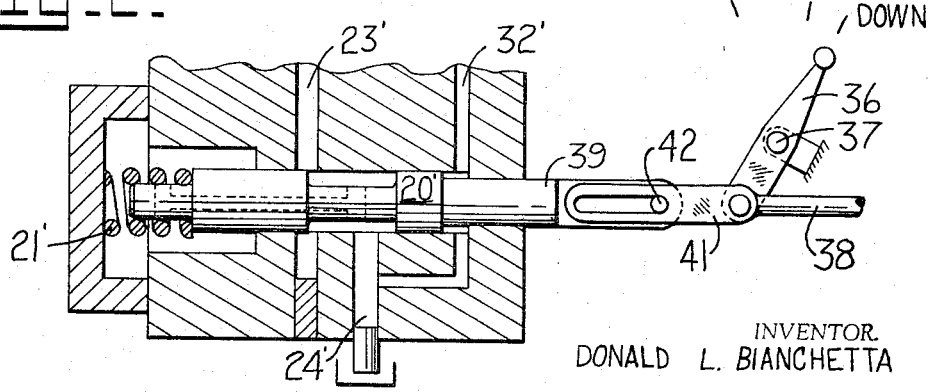

In the drawing:

FIG. 1 is a schematic view illustrating a portion of the hydraulic system of a vehicle, a portion of the electrical system of the same vehicle and an accumulator valve bleed mechanism embodying the present invention; and FIG. 2 is a fragmentary view showing a modified form of a part of the accumulator valve shown in FIG. 1.

As shown in the drawing, a pump 10 withdraws fluid from the reservoir 11 and directs it by way of suitable conduits through a filter 12 and an accumulator charging valve illustrated at 13. Pressure is then directed to the brake and steering systems and other hydraulically actuated components of the vehicle and emergency pressure is made available from an accumulator illustrated at 14 which is of a well known air over oil type charged with pressure during operation of the pump 10. The accumulator provides an auxiliary pressure supply as well as an emergency supply which may be used in the event of pump failure or failure of any of the lines or equipment between the pump and the accumulator charging valve.

The accumulator pressure bleed valve is generally shown at 16 as including two valve units, both of which must be open in order to bleed pressure from the accumulator. The accumulator is connected with the valve 16 by means of a line 17. The first valve unit of the accumulator comprises a spool 18 urged to the open position shown by a spring 19. The second valve unit is shown as having a spool 20 urged to its open position shown as by a spring 21. With both valves open, pressure from the accumulator passing through line 17 is admitted to a passage 23 and thence through a passage 24 which communicates with the reservoir as shown. When the vehicle is in service and the engine is running, pressure from the pump is directed by a line 26 to a chamber at one end of the spool 18 overcoming the force of spring 19 and moving the spool to its closed position. Simultaneously energization of the vehicle electrical system by closing a switch 27 in a circuit, generally indicated at 28, energizes a solenoid represented at 30 which overcomes the force of spring 21 and moves spool 20 to its closed position. The circuit 28 is the conventional electric circuit employed for energizing lights and horn as well as for the starter mechanism of the vehicle and the operation of other electrical components. This circuit is always opened by opening the switch 27 which disables the circuit by isolating it from ground at any time that the vehicle is left unattended.

In operation when a vehicle having the system of the present invention is placed in service starting of the engine drives the pump 10 and the valve spool 18 is moved to its closed position by pressure from the pump so that the accumulator is charged through the charging valve 13. At the same time, closing of the main electrical switch 27 effects closing of the valve spool 20 and accumulator pressure will not be bled to the reservoir until such time as the motor is shut down and the switch 27 is opened.

In case of pressure leaking past either of the spools toward their right hand ends passages 32 and 33 communicate the leaking fluid to the reservoir. Similarly any fluid which may lead into the spring chamber of the spool 20 is communicated to the reservoir by means of a passage in the spool shown in dotted lines at 34.

A modified form of the actuating mechanism for the spool 20 shown in FIG. 1 is illustrated in FIG. 2 wherein the spool is shown at 20' as adapted to close communication between passages 23' and 24'. In this case the valve spool 20' would be in series with a valve like that shown at 18 in FIG. 1 and would be urged to a closed position by spring 21'. An engine governor control lever is illustrated at 36 as pivoted about a point 37 to actuate linkage, a portion of which is shown at 38 to control a governor (not shown). The lever 36 is capable of being manipulated between various governor positions such as high idle, low idle and shutdown as indicated on the drawing. The lever 36 is also connected with a link 39 connected with the valve spool 20' for moving it to the open position shown against the force of spring 21'. Adjustment of the lever 36 during operation of the engine between low idle and high idle position takes place without moving the valve spool. This is made possible by a lost motion connection which includes a slotted link 41 pivoted to lever 36 and embracing a pin 42 on the link 39. Thus, when the lever 36 is moved to the shutdown position shown, the end of the slot in link 41 engages pin 42 to move spool 20' to the open position shown.

With either of the two modifications of the invention described above, there are two valves in series both of which must be opened to effect bleeding of the accumulator and, in both modifications, one valve is opened when the vehicle engine stops and the other valve is opened in response to a manual adjustment which is normally made when the vehicle is taken out of operation.

I claim:

1. In a vehicle hydraulic system including an accumulator which is normally pressurized during operation of the vehicle, means to bleed pressure from the accumulator comprising two valves in series, means normally holding said valves closed during operation of the vehicle, means for opening one of said valves when the vehicle engine stops and means for opening the other valve in response to a manual adjustment normally made when the vehicle is taken out of operation.

2. Means to bleed pressure from the accumulator of a vehicle having an engine driven pump and an electrical system with a switch for de-energizing the system, comprising a bleed circuit with two normally open valves, means for closing one valve with pressure from the pump when the engine is operating, and electrical means for closing the other valve with electrical energy when the electrical system is energized.

3. The combination of claim 2 in which the valves have slidable spools, and a solenoid energized by the electrical system urges one spool toward its closed position.

4. The combination of claim 3 in which pump pressure engages one end of the other spool to urge it toward its closed position.

5. The combination of claim 4 in which springs urge both valves toward their open positions.

References Cited

UNITED STATES PATENTS

| | | | |
|---|---|---|---|
| 2,641,106 | 6/1953 | Jelinck | 60—51 |
| 2,850,878 | 9/1958 | Sam Pietro et al. | 60—52 X |

ROBERT M. WALKER, *Primary Examiner.*